March 10, 1936.    H. BENZING    2,033,605
JOINT FOR CONNECTING MOVABLE MEMBERS OF TYPEWRITERS OR THE LIKE
Original Filed Dec. 1, 1933
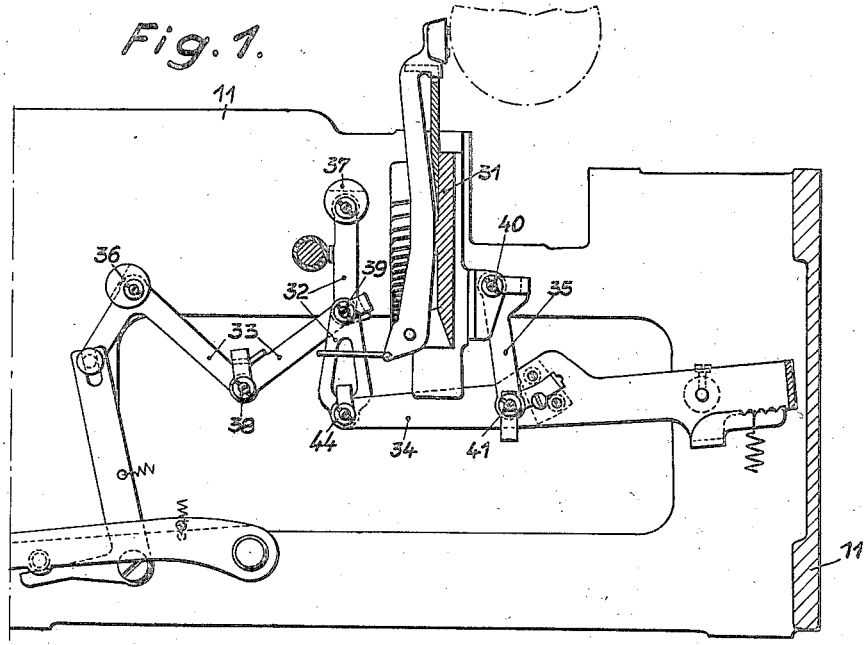
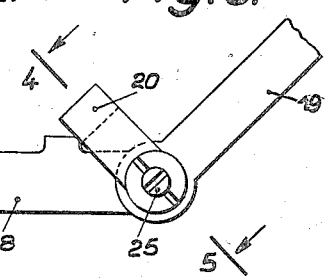
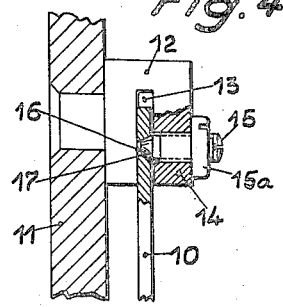
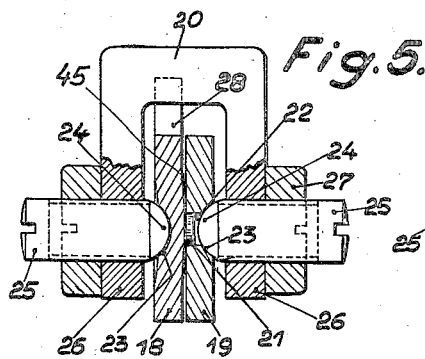
Inventor:
Hugo Benzing
BY Munn, Anderson & Liddy
Attorneys Patented Mar. 10, 1936

2,033,605

UNITED STATES PATENT OFFICE 2,033,605

JOINT FOR CONNECTING MOVABLE MEMBERS OF TYPEWRITERS OR THE LIKE

Hugo Benzing, Dresden, Germany, assignor to Aktiengesellschaft vorm. Seidel & Naumann, Dresden, Germany Original application December 1, 1933, Serial No. 700,530, now Patent No. 2,008,383, dated July 16, 1935. Divided and this application March 12, 1935, Serial No. 10,709. In Germany December 10, 1932

3 Claims. (Cl. 287—101)

My invention relates to joints for connecting movable members of typewriters or the like and more particularly to movable members forming part of a shift mechanism of a typewriter, calculating machine or the like as described in my copending application Serial No. 700,530, filed December 1, 1933, now a patent, No. 2,008,383, of July 16, 1935, of which this case is a division.

It is an object of my invention to provide a joint of the kind referred to which is devoid of play, but allows an adjustment for compensating unavoidable differences which occur in the manufacture of the members forming part of the apparatus or are due to wear.

In the drawing affixed to this specification and forming part thereof some embodiments of my invention are illustrated diagrammatically by way of example.

In the drawing

Fig. 1 is an elevation of a shift mechanism of a typewriter in the operative position, said mechanism being provided with joints according to my invention.

Figs. 2 and 3 are elevations of two embodiments of joints according to my invention.

Fig. 4 is a section according to the line 3—3 in Fig. 1.

Fig. 5 is a section of the joint shown in Fig. 3 according to the line 4—4 in Fig. 3.

Fig. 6 is a similar section as shown in Fig. 5 of a modified embodiment of my invention.

In the frame 11 of the machine there is mounted a frame 34. The arms of the frame 34 are engaged at 41 by links 35, the opposite ends of which are pivoted at 40 to a type bar segment 31 which is actuated by means of a pair of knee-joints 32, 33. The arm of the frame 34 is extended beyond the pivot point 41, and carries at its end a stud 44 engaged by the lower end of the knee-joint 32, the second joint portion of which is secured in permanent and rotatable fashion in a bearing 37 mounted on the frame 11 of the machine. The middle joint portion 39 of the knee-joint 32 is engaged by the second knee-joint 33 with its one end, the opposite end of which is mounted in permanent and rotatable fashion in the bearing 36 on the machine frame 11. The middle joint portion of this knee-joint is designated 38.

An important factor as regards faultless operation of the shift mechanism when employing a system composed of two knee-joints is the proper embodiment of all pivot points and joints.

In Fig. 4 there is shown a possible form of embodiment of a bearing of this kind on enlarged scale such as may conveniently be employed for the fixed bearing points 36 and 37. A block 12, which is secured in any suitable fashion to the frame 11 of the machine, possesses an incision 13, so that there is formed a fork-like portion 14. In the part 14 there is provided a stud 15, which is conical, tapered, part-spherical or also pointed at its end 16, and is shaped, for example, as a worm screw, which may be secured in the usual fashion by a nut 15a. The lever 18 to be mounted possesses a boring 17, which corresponds with the end 16 of the stud 15 and engages with the same, the lever thus being securely mounted.

Figs. 5 and 6 show possible forms of embodiment for pivot points which are not of a permanent kind, such as may be employed for example in connection with the points 40, 41, 44, and 38 (Fig. 5) and the point 39 (Fig. 6). A yoke portion 20 encompasses with its two arms 26 the levers 18, 19 or 29 to be pivotally connected. The studs 25 provided in the two arms 26 engage by means of their conical, tapered, part-spherical or pointed ends 24 the levers to be mounted on the outer faces in corresponding bores or recesses.

In Fig. 5 the one lever 18 is furnished with a stud 21 passing into a bore 22 in the other lever 19. The lever 18 rests against the lever 19 with a curvature 45 in order to prevent jamming in the joint if, for example, owing to differences in the manufacture, the lever 19 does not swing exactly in the correct plane. According to Fig. 6, three levers are provided, of which the middle lever 29 possesses on either side studs 30, which engage in corresponding bores 22 in the adjacent levers 18, 19. These studs 21 and 30 in the case of weak levers are preferably formed in a stamping operation by means of correspondingly shaped dies, which act simultaneously on both sides and are hollow at the centre for the purpose of forming the studs. A shoulder 28 on one of the levers supports the yoke 20, and thus prevents a swinging backwards and forwards and accordingly a disturbing noise.

These bearings offer advantage in various respects, particularly as regards large-scale production and manufacture on a moving belt. The studs may be produced by automatic machines without subsequent finishing, and the levers are stamped with special tools in one operation; the new bearings nevertheless operate accurately, since in a manner of speaking the same are able to yield. Small differences in the manufacture, which are difficult to avoid, may be compensated by adjustment of the bearings. The adjustment may be performed readily as considered necessary, and after any wear which may take place the bearings may be tightened, whereupon the transmission will again occur without play. All the levers are flat, made of sheet steel and are easily movable.

I wish it to be understood that I do not desire to be limited to the exact details of construction shown and described for obvious modifications will occur to a person skilled in the art.

I claim:—

1. In a joint for levers made from sheet steel for use in shifting mechanisms of typewriters, calculating machines, and the like, the combination of an easily movable flat lever, the thickness of which being less than the diameter of the pivotal pins for said lever, and arranged in contact with each other, a U-shaped member comprising a pair of legs encompassing said movable levers, a stud forming a pivotal pin and arranged in a bore of one of said legs and having an end portion of gradually decreasing diameter, said end portion engaging a correspondingly shaped recess provided in that one of said movable levers which is arranged adjacently to said leg provided with the bore and a stud forming part of the other movable lever and engaging a correspondingly shaped bore in the first movable lever.

2. In a joint for connecting movable members forming part of a shift mechanism of a typewriter, calculating machine or the like in combination two movable members, each having on its surface a curved portion with which said members are arranged in contact with each other, a U-shaped member comprising a pair of legs encompassing said movable members and a stud arranged in a bore of one of said legs and having an end portion of gradually decreasing diameter, said end portion engaging a correspondingly shaped recess provided in that one of said movable members which is arranged adjacently to said leg provided with the bore.

3. In a joint for connecting movable members forming part of a shift mechanism of a typewriter, calculating machine or the like in combination two movable members, each having on its surface a curved portion with which said members are arranged in contact with each other, a U-shaped member comprising a pair of legs encompassing said movable members, a stud arranged in a bore of one of said legs and having an end portion of gradually decreasing diameter, said end portion engaging a correspondingly shaped recess provided in that one of said movable members which is arranged adjacently to said leg provided with the bore, and a stud forming part of the other movable member and engaging a correspondingly shaped core in the first movable member, said studs, said bore and said recess being arranged substantially in alignment with each other and the curved portions of the surfaces of said movable members.

HUGO BENZING.